US010616458B2

(12) United States Patent
Yasugi et al.

(10) Patent No.: US 10,616,458 B2
(45) Date of Patent: Apr. 7, 2020

(54) IMAGING APPARATUS AND IMAGE PROCESSING METHOD

(71) Applicant: Panasonic Intellectual Property Management Co., Ltd., Osaka (JP)

(72) Inventors: Shunsuke Yasugi, Osaka (JP); Hiroya Kusaka, Hyogo (JP); Taro Imagawa, Osaka (JP); Akihiro Noda, Nara (JP)

(73) Assignee: Panasonic Intellectual Property Management, Osaka (JP)

( * ) Notice: Subject to any disclaimer, the term of this patent is extended or adjusted under 35 U.S.C. 154(b) by 30 days.

(21) Appl. No.: 16/135,308

(22) Filed: Sep. 19, 2018

(65) Prior Publication Data
US 2019/0037115 A1 Jan. 31, 2019

Related U.S. Application Data

(63) Continuation of application No. PCT/JP2016/004700, filed on Oct. 26, 2016.

(30) Foreign Application Priority Data

Mar. 28, 2016 (JP) .................................. 2016-062994

(51) Int. Cl.
*H04N 5/225* (2006.01)
*G01J 3/28* (2006.01)
(Continued)

(52) U.S. Cl.
CPC .............. *H04N 5/2256* (2013.01); *G01J 3/10* (2013.01); *G01J 3/2803* (2013.01);
(Continued)

(58) Field of Classification Search
CPC ........ H04N 5/2256; G01J 3/10; G01J 3/2803; G01J 3/2823; G01J 3/46; G01J 3/36;
(Continued)

(56) References Cited

U.S. PATENT DOCUMENTS 8,174,585 B2 * 5/2012 Suzuki ................. H04N 1/6055
345/600
8,441,642 B2 * 5/2013 Wegmuller ............... G01J 3/02
356/420
(Continued)

FOREIGN PATENT DOCUMENTS

JP 2007-097710 4/2007
JP 2007-264537 10/2007
(Continued)

OTHER PUBLICATIONS

International Search Report of PCT application No. PCT/JP2016/004700 dated Jan. 31, 2017.

*Primary Examiner* — Pritham D Prabhakher
(74) *Attorney, Agent, or Firm* — McDermott Will & Emery LLP

(57) ABSTRACT

A lighting unit includes a plurality of light sources that respectively emit plural rays of illumination light. An imaging unit that simultaneously images plural rays of reflected light obtained by the plural rays of illumination light being reflected by a subject so as to obtain information about a plurality of colors, and generates a captured image including the information about the plurality of colors. A memory stores sensitivity information items that correspond to the plurality of light sources respectively. An arithmetic unit performs an arithmetic operation to generate a plurality of separated images from the captured image by using the sensitivity information items. The plurality of separated images correspond to the plurality of light sources respectively, and each of the plurality of separated images only includes information about a corresponding one of the plural rays of reflected light.

20 Claims, 5 Drawing Sheets

(51) Int. Cl.
*G01J 3/10* (2006.01)
*G01J 3/46* (2006.01)
*G02B 5/20* (2006.01)
*H05B 33/08* (2020.01)
*G01J 3/12* (2006.01)
*G01J 3/36* (2006.01)

(52) U.S. Cl.
CPC ............... *G01J 3/2823* (2013.01); *G01J 3/46* (2013.01); *G02B 5/20* (2013.01); *H05B 33/0845* (2013.01); *H05B 33/0857* (2013.01); *G01J 3/36* (2013.01); *G01J 2003/1282* (2013.01); *G01J 2003/2806* (2013.01); *G01J 2003/2826* (2013.01)

(58) Field of Classification Search
CPC ....... G01J 2003/1282; G01J 2003/2806; G01J 2003/2826; G02B 5/20; H05B 33/0845; H05B 33/0857; A61B 1/043; A61B 1/00; A61B 1/00009; A61B 1/00186; A61B 1/06; A61B 1/0638; A61B 5/0075; A61B 5/0084; G01N 21/6456; G01N 2021/6419; G01N 2021/6421
USPC ........................................................ 348/370
See application file for complete search history.

(56) References Cited

U.S. PATENT DOCUMENTS

| | | | | |
|---|---|---|---|---|
| 10,448,816 B2 * | 10/2019 | Moriya | ............. | A61B 1/00009 |
| 2006/0098096 A1 * | 5/2006 | Gupta | .................. | H04N 1/401 |
| | | | | 348/188 |
| 2008/0218635 A1 * | 9/2008 | Tsuruoka | .................. | G06T 5/50 |
| | | | | 348/607 |
| 2009/0137908 A1 * | 5/2009 | Patwardhan | ......... | A61B 5/0059 |
| | | | | 600/476 |
| 2010/0238329 A1 | 9/2010 | Suzuki | | |
| 2010/0296141 A1 * | 11/2010 | Maruyama | ......... | H04N 1/02865 |
| | | | | 358/509 |
| 2010/0328667 A1 * | 12/2010 | Wegmuller | ............... | G01J 3/02 |
| | | | | 356/402 |
| 2011/0218398 A1 | 9/2011 | Tamura et al. | | |
| 2012/0241620 A1 * | 9/2012 | On | .................... | A61B 1/00172 |
| | | | | 250/338.1 |
| 2013/0012794 A1 * | 1/2013 | Zeng | ................. | A61B 1/00186 |
| | | | | 600/328 |
| 2013/0242137 A1 * | 9/2013 | Kirkland | ................ | G03B 37/02 |
| | | | | 348/231.99 |
| 2013/0308045 A1 * | 11/2013 | Rhoads | ................ | H04N 5/2256 |
| | | | | 348/371 |
| 2013/0329006 A1 * | 12/2013 | Boles | ................. | H04N 1/40056 |
| | | | | 348/42 |
| 2014/0293091 A1 * | 10/2014 | Rhoads | ................... | G01J 3/513 |
| | | | | 348/234 |
| 2016/0307326 A1 * | 10/2016 | Wang | .................... | G01B 11/22 |

FOREIGN PATENT DOCUMENTS

| | | |
|---|---|---|
| JP | 2009-141684 | 6/2009 |
| JP | 2015-053979 | 3/2015 |
| JP | 2015-177812 | 10/2015 |
| WO | 2010/055938 | 5/2010 |

* cited by examiner

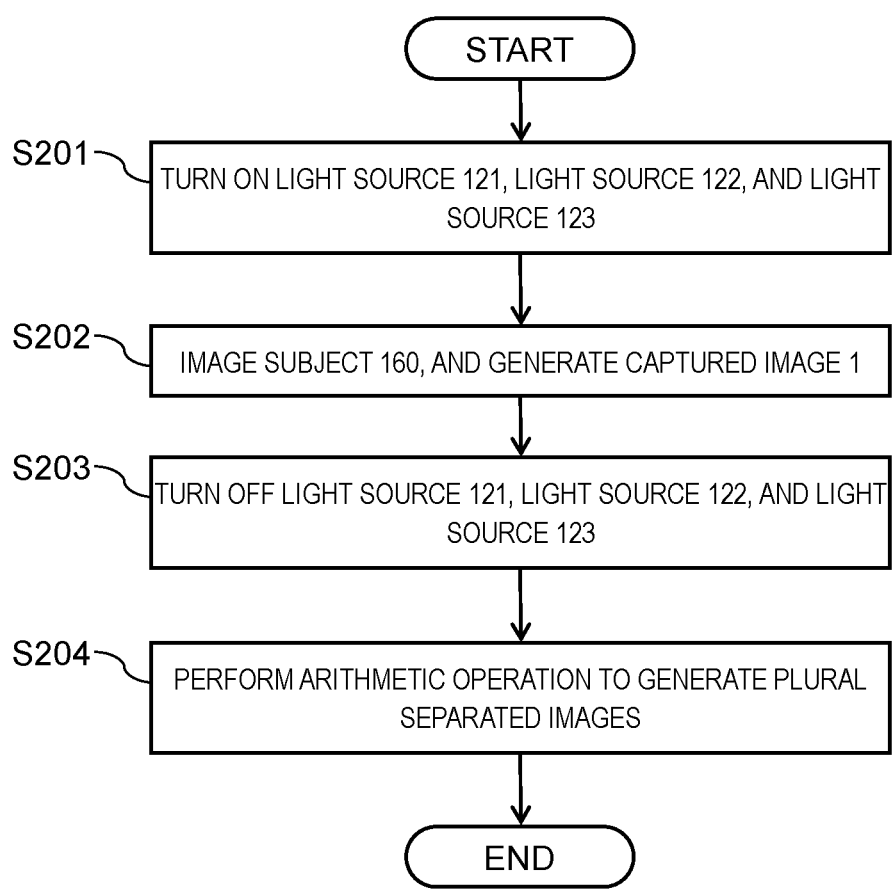

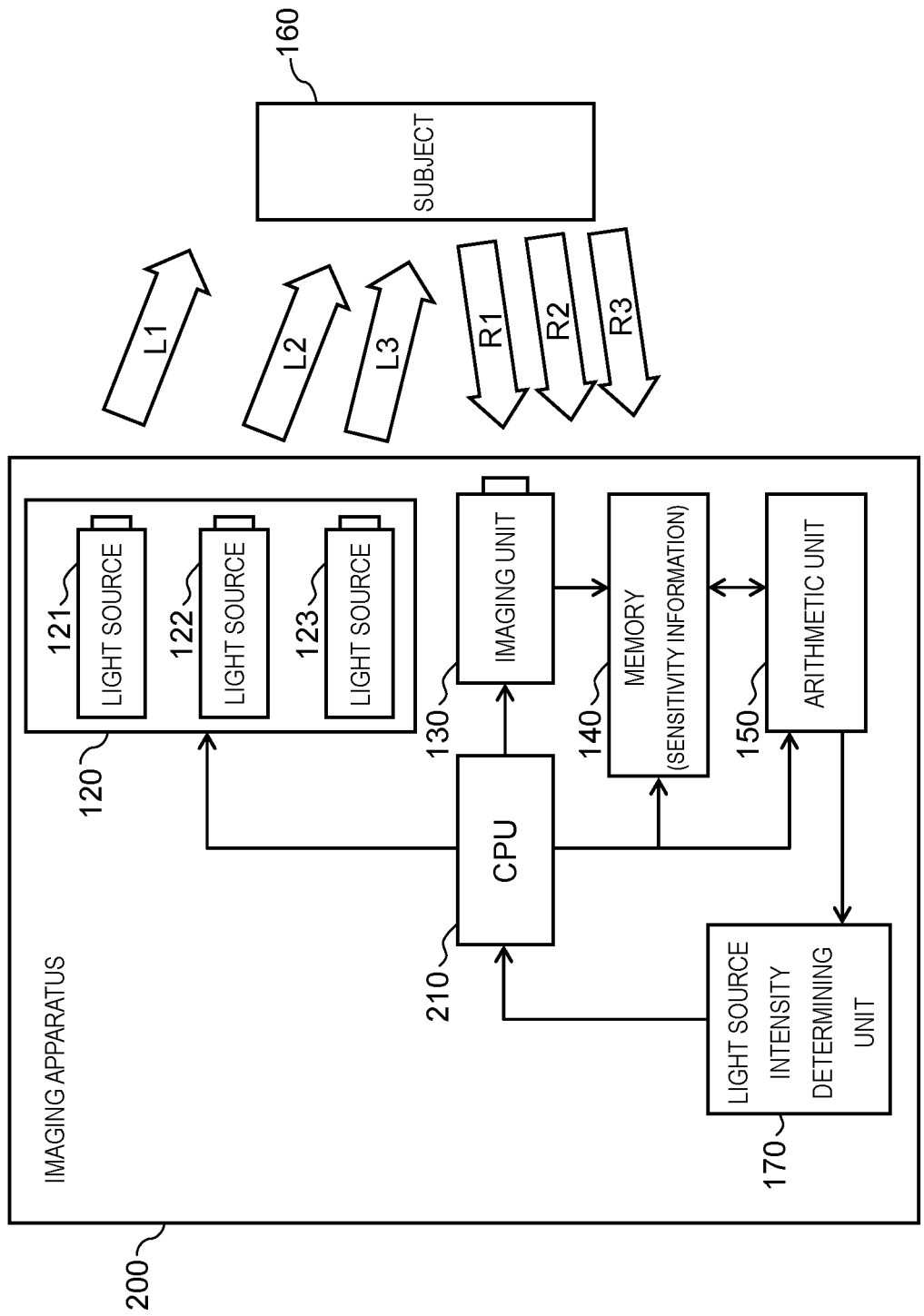

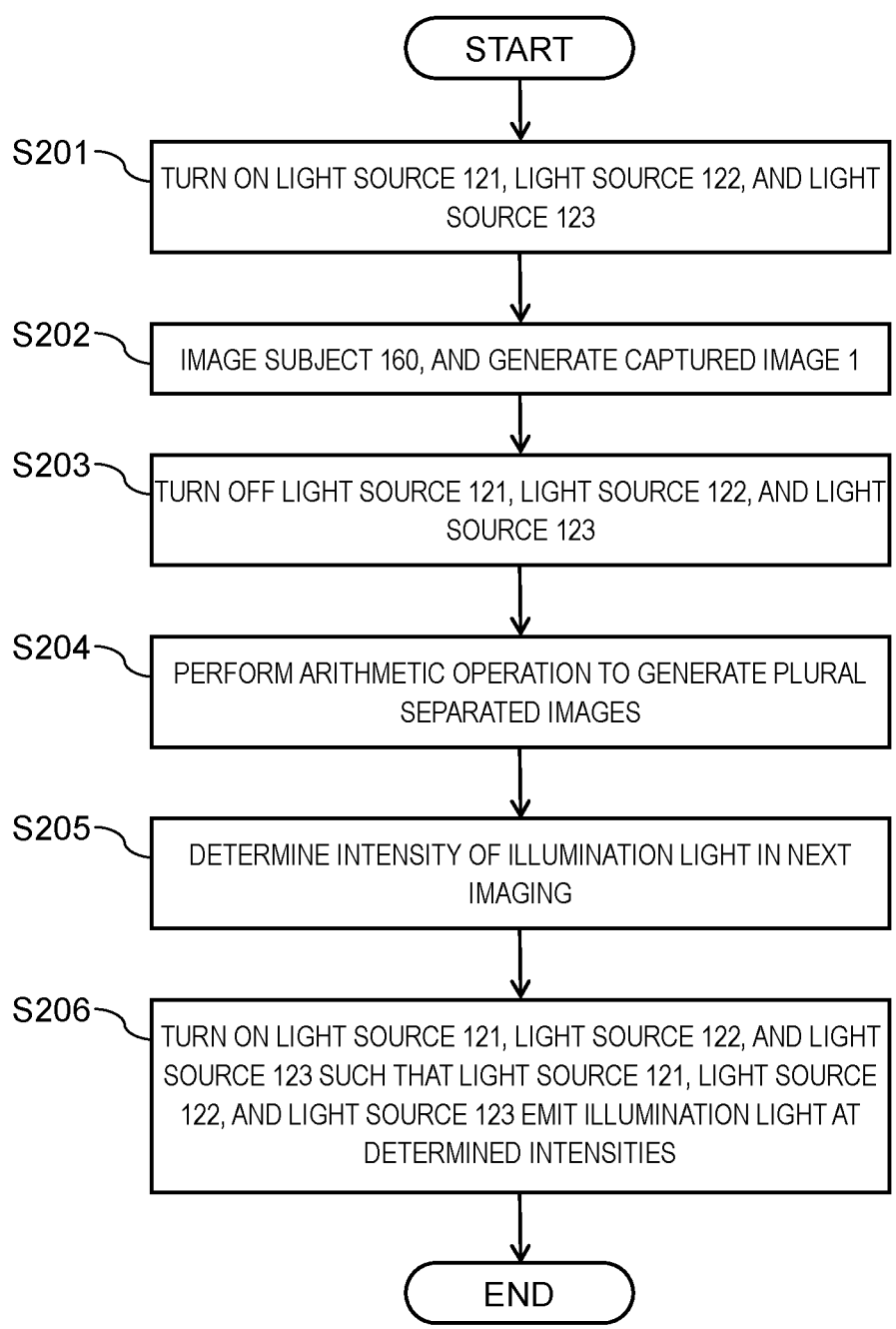

IMAGING APPARATUS AND IMAGE PROCESSING METHOD

TECHNICAL FIELD

The present disclosure relates to an imaging apparatus that performs an arithmetic operation to generate a plurality of images including information about reflected light that has been reflected by a subject, and an image processing method.

BACKGROUND ART

PTL 1 discloses a color conversion coefficient calculator. The color conversion coefficient calculator calculates a color conversion coefficient for converting a first color signal made up of a plurality of color signals into a second color signal made up of a plurality of color signals. The color conversion coefficient calculator includes color conversion coefficient calculation means, correction coefficient calculation means, and coefficient correction means. The color conversion coefficient calculation means calculates a color conversion coefficient for converting a first spectral characteristic that characterizes the first color signal in a standard fashion into a second spectral characteristic that characterizes the second color signal. The correction coefficient calculation means calculates a correction coefficient for approximating a base color signal serving as a first color signal that corresponds to a plurality of base colors to a reference color signal that is obtained based on the first spectral characteristic in accordance with the plurality of base colors. The coefficient correction means corrects the color conversion coefficient by using the correction coefficient. The base color signal is a first color signal that is obtained by imaging color patches of a plurality of colors that correspond to the plurality of base colors. The reference color signal is a color signal that is obtained based on spectral characteristics of the color patches of the plurality of colors and the first spectral characteristic. Each of the color patches is a color patch that emits light in a specified narrow band.

By doing this, the color conversion coefficient calculator described above can easily realize high-precision color conversion processing according to a difference between individuals in addition to a difference between models.

CITATION LIST

Patent Literature

PTL 1: Unexamined Japanese Patent Publication No. 2009-141684

SUMMARY

The present disclosure provides an imaging apparatus that performs an arithmetic operation to generate a plurality of images that each only include information about monochromatic reflected light from a single captured image, and an image processing method.

The imaging apparatus according to the present disclosure includes a lighting unit, an imaging unit, a memory, and an arithmetic unit. The lighting unit includes a plurality of light sources that respectively emit rays of monochromatic illumination light that have center wavelengths different from each other. The lighting unit simultaneously irradiates a subject with plural rays of illumination light emitted by the plurality of light sources. The imaging unit simultaneously images plural rays of reflected light obtained by the plural rays of illumination light being reflected by the subject so as to obtain information about a plurality of colors, and the imaging unit generates a captured image including the information about the plurality of colors. The memory stores sensitivity information items that correspond to the plurality of light sources respectively and each of the sensitivity information items relates to sensitivities of the imaging unit to the plurality of colors. The arithmetic unit performs an arithmetic operation to generate a plurality of separated images from the captured image by using the sensitivity information items. The plurality of separated images corresponds to the plurality of light sources respectively. Each of the plurality of separated images only includes information about a corresponding one of the plural rays of reflected light.

The image processing method according to the present disclosure includes an irradiation step, an imaging step, and an arithmetic step. The irradiation step is a step of simultaneously irradiating a subject with plural rays of illumination light emitted by a plurality of light sources, the plurality of light sources respectively emitting the plural rays of illumination light that are monochromatic and that have center wavelengths different from each other. The imaging step is a step of simultaneously imaging, by the imaging unit, plural rays of reflected light obtained by the plural rays of illumination light being reflected by the subject so as to obtain information about a plurality of colors, and of generating a captured image including the information about the plurality of colors. The arithmetic step is a step of performing an arithmetic operation to generate a plurality of separated images from the captured image by using sensitivity information items. The sensitivity information items correspond to the plurality of light sources respectively and each of the sensitivity information items relates to sensitivities of the imaging unit to the plurality of colors. The plurality of separated images correspond to the plurality of light sources respectively, and each of the plurality of separated images only includes information about a corresponding one of the plural rays of reflected light.

The imaging apparatus and the image processing method according to the present disclosure can perform an arithmetic operation to generate a plurality of images that each only include information about monochromatic reflected light from a single captured image. Further, the imaging apparatus and the image processing method according to the present disclosure can increase a degree of freedom in selection of a wavelength that corresponds to each of the plurality of images.

BRIEF DESCRIPTION OF DRAWINGS

FIG. 3 is a flowchart for describing an operation of the imaging apparatus according to the first exemplary embodiment.

FIG. 4 is a block diagram illustrating a configuration of an imaging apparatus according to a second exemplary embodiment.

FIG. 5 is a flowchart for describing an operation of the imaging apparatus according to the second exemplary embodiment.

DESCRIPTION OF EMBODIMENTS

Figure 1:
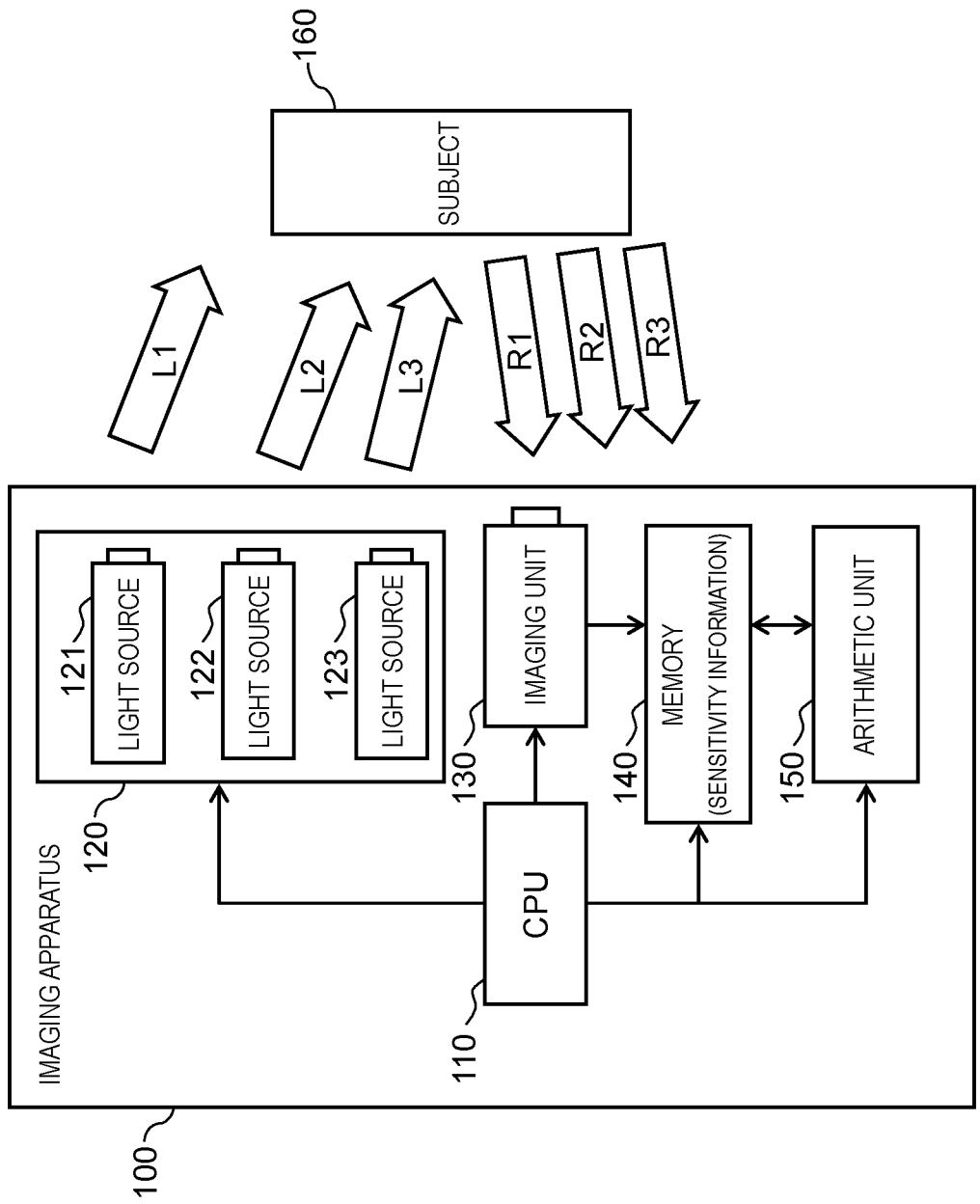
FIG. 1 is a block diagram illustrating a configuration of an imaging apparatus according to a first exemplary embodiment.

Hereinafter, exemplary embodiments are described in detail with appropriate reference to the drawings. However, an unnecessarily detailed description may be omitted. For example, a detailed description of a well-known matter and a duplicate description of substantially the same configuration may be omitted. This is to avoid the following description from being unnecessarily redundant and thus to help those skilled in the art to easily understand the description.

It should be noted that the accompanying drawings and the following description are provided for those skilled in the art to fully understand the present disclosure, and are not intended to limit the subject matter as described in the appended claims.

First Exemplary Embodiment

A first exemplary embodiment is described below with reference to FIGS. 1 to 3.
[1-1. Configuration]
[1-1-1. Reflected Light and Spectral Distribution]

Reflected light is light that is reflected by a substance when the substance is irradiated with light, and reflects characteristics of the substance. Accordingly, the reflected light is utilized for qualitative and quantitative analysis of the substance.

A spectral distribution is obtained, for example, by continuously splitting light into rays of light of respective wavelengths by using a diffraction grating. The spectral distribution indicates a distribution of an intensity of light of each of the wavelengths. A spectral distribution of reflected light reflects characteristics of a substance that reflects light. The spectral distribution of the reflected light is expressed by a graph in which a horizontal axis indicates a wavelength and a vertical axis indicates an intensity of the reflected light of each wavelength. A distribution shape in the graph reflects qualitative information of the substance. In addition, a total intensity in the graph reflects quantitative information of the substance. Hereinafter, a spectral distribution indicating the qualitative information is referred to as a relative spectral distribution.
[1-1-2. RGB Vector]

In the present exemplary embodiment, an RGB value of each pixel of a captured image generated by capturing an image using an RGB camera is considered as a three-dimensional vector, and the RGB value is referred to as an RGB vector. A direction and a length of the RGB vector are described below. Here, R means red, G means green, and B means blue.

The direction of the RGB vector is information that reflects a ratio of values of respective colors of the RGB value. A direction of an RGB vector of reflected light includes information relating to a qualitative characteristic of a substance that reflects light. Stated another way, the direction of the RGB vector of the reflected light relates to the relative spectral distribution. For example, an RGB vector with a length normalized to 1 can be used as the direction of the RGB vector. The length of the RGB vector is a value that reflects a total intensity of the RGB value. A length of the RGB vector of the reflected light includes information relating to a quantitative characteristic of a substance that reflects light.

When observation light having a certain spectral distribution is imaged using the RGB camera, respective values of an RGB vector of a certain pixel are described below. An R value is obtained by multiplying a spectral distribution of the observation light by a spectral sensitivity characteristic of R of the RGB camera and integrating the obtained value. A G value is obtained by multiplying the spectral distribution of the observation light by a spectral sensitivity characteristic of G of the RGB camera and integrating the obtained value. A B value is obtained by multiplying the spectral distribution of the observation light by a spectral sensitivity characteristic of B of the RGB camera and integrating the obtained value. Accordingly, in a case where plural respective rays of observation light are imaged using the same RGB camera, directions of plural corresponding RGB vectors are identical to each other as long as spectral distributions of the plural rays of observation light are identical to each other. Stated another way, the direction of the RGB vector includes information about the relative spectral distribution of the observation light. Further, when only an intensity of the observation light changes while the relative spectral distribution of the observation light is kept identical, only a length of the RGB vector of the observation light changes. Stated another way, the length of the RGB vector includes information relating to an intensity in the spectral distribution of the observation light. Note that, in the present exemplary embodiment, it is considered that the RGB vector is also one example of the spectral distribution and that the direction of the RGB vector is also one example of the relative spectral distribution. Accordingly, the RGB vector is also referred to as a spectral distribution, and the direction of the RGB vector is also referred to as a relative spectral distribution.

Here, assume that an RGB vector of reflected light obtained by irradiating a certain subject with light having a certain intensity is vector V1, and that an RGB vector of reflected light obtained by irradiating the subject with light having a double intensity is vector V2. In this case, directions of vector V1 and vector V2 are not different from each other, but a length of vector V2 is twice a length of vector V1.
[1-1-3. Configuration of Imaging Apparatus]

FIG. 1 is a block diagram illustrating a configuration of imaging apparatus 100 according to the first exemplary embodiment.

Imaging apparatus 100 includes central processing unit (CPU) 110, lighting unit 120, imaging unit 130, memory 140, and arithmetic unit 150. Lighting unit 120 includes light source 121, light source 122, and light source 123 that emit respective rays of monochromatic illumination light that have relative spectral distributions different from each other.

CPU 110 instructs the respective components to perform an operation. As an example, CPU 110 instructs lighting unit 120 to turn on or off light source 121, light source 122, and light source 123. CPU 110 also instructs imaging unit 130 to capture an image. Further, CPU 110 instructs arithmetic unit to perform an arithmetic operation.

Lighting unit 120 simultaneously irradiates subject 160 with plural rays of illumination light emitted by light source 121, light source 122, and light source 123. In the present disclosure, a number of light sources means a number of light sources that emit respective rays of monochromatic illumination light that have relative spectral distributions different from each other. Respective rays of illumination light emitted by light source 121, light source 122, and light source 123 have center wavelengths different from each other. Here, a center wavelength that illumination light has is, for example, a wavelength at which an intensity of the illumination light becomes maximum in a spectral distribution of the illumination light. Stated another way, lighting unit 120 includes light source 121, light source 122, and light source 123 that emit respective rays of monochromatic illumination light that have center wavelengths different from each other. Lighting unit 120 simultaneously irradiates subject 160 with plural rays of illumination light emitted by light source 121, light source 122, and light source 123. Here, the monochromatic light is not limited to light that only has a single wavelength. The monochromatic light may have a wavelength band that a normal light emitting diode (LED) has.

In the present exemplary embodiment, each of light source 121, light source 122, and light source 123 is, for example, an LED. Light source 121 emits illumination light L1 having a center wavelength of 450 nm. Light source 122 emits illumination light L2 having a center wavelength of 550 nm. Light source 123 emits illumination light L3 having a center wavelength of 650 nm. Lighting unit 120 causes light source 121, light source 122, and light source 123 to simultaneously emit light in accordance with an instruction from CPU 110, and lighting unit 120 simultaneously irradiates subject 160 with illumination light L1, illumination light L2, and illumination light L3.

Subject 160 reflects the illumination light emitted by each of the light sources. In FIG. 1, assume that light obtained by illumination light L1 being reflected by subject 160 is reflected light R1. Also assume that light obtained by illumination light L2 being reflected by subject 160 is reflected light R2. Further, assume that light obtained by illumination light L3 being reflected by subject 160 is reflected light R3. An intensity of reflected light R1 is obtained by multiplying an intensity of illumination light L1 by a reflectance of subject 160 at a wavelength of illumination light L1. An intensity of reflected light R2 is obtained by multiplying an intensity of illumination light L2 by a reflectance of subject 160 at a wavelength of illumination light L2. An intensity of reflected light R3 is obtained by multiplying an intensity of illumination light L3 by a reflectance of subject 160 at a wavelength of illumination light L3. In addition, lighting unit 120 simultaneously irradiates subject 160 with illumination light L1, illumination light L2, and illumination light L3, and therefore light reflected by subject 160 is light in which reflected light R1, reflected light R2, and reflected light R3 are mixed.

The intensities of the respective rays of illumination light may be identical to each other, or may be different from each other. As described later, it is desirable that the intensities of the respective rays of reflected light be almost equal to each other. Accordingly, when a spectral reflectance of subject 160 is known in advance, the intensities of the respective rays of illumination light may be set according to respective reflectances of subject 160 that correspond to the center wavelengths of the respective rays of illumination light. Specifically, when a ratio of reflectances of subject 160 that respectively correspond to the center wavelengths of illumination light L1, illumination light L2, and illumination light L3 is 1:2:4, a ratio of the intensities of illumination light L1, illumination light L2, and illumination light L3 may be set to 4:2:1. By doing this, the respective intensities of reflected light R1, reflected light R2, and reflected light R3 become almost equal to each other because an intensity of reflected light is the product of an intensity of illumination light and a reflectance of subject 160. Stated another way, an intensity of illumination light of each of a plurality of light sources may be greater than an intensity of other illumination light having a center wavelength that corresponds to a reflectance of subject 160 that is greater than a reflectance of subject 160 that corresponds to a center wavelength of the illumination light of each of the plurality of light sources. As an example, the intensity of illumination light L2 is greater than the intensity of illumination light L3 having a center wavelength (650 nm) that corresponds to a reflectance of subject 160 that is greater than a reflectance of subject 160 that corresponds to the center wavelength (550 nm) of illumination light L2.

Imaging unit 130 includes a lens and an imaging element. The lens included in imaging unit 130 forms, on the imaging element, an image of subject 160 using reflected light R1, reflected light R2, and reflected light R3 that have been reflected by subject 160. The imaging element included in imaging unit 130 has pixels of an RGB Bayer array, and obtains information about three colors. In other words, imaging unit 130 operates as an RGB camera. Imaging unit 130 simultaneously images reflected light R1, reflected light R2, and reflected light R3 so as to obtain information about three colors, and generates a captured image including the information about the three colors. Imaging unit 130 stores the generated captured image in memory 140.

Figure 2:
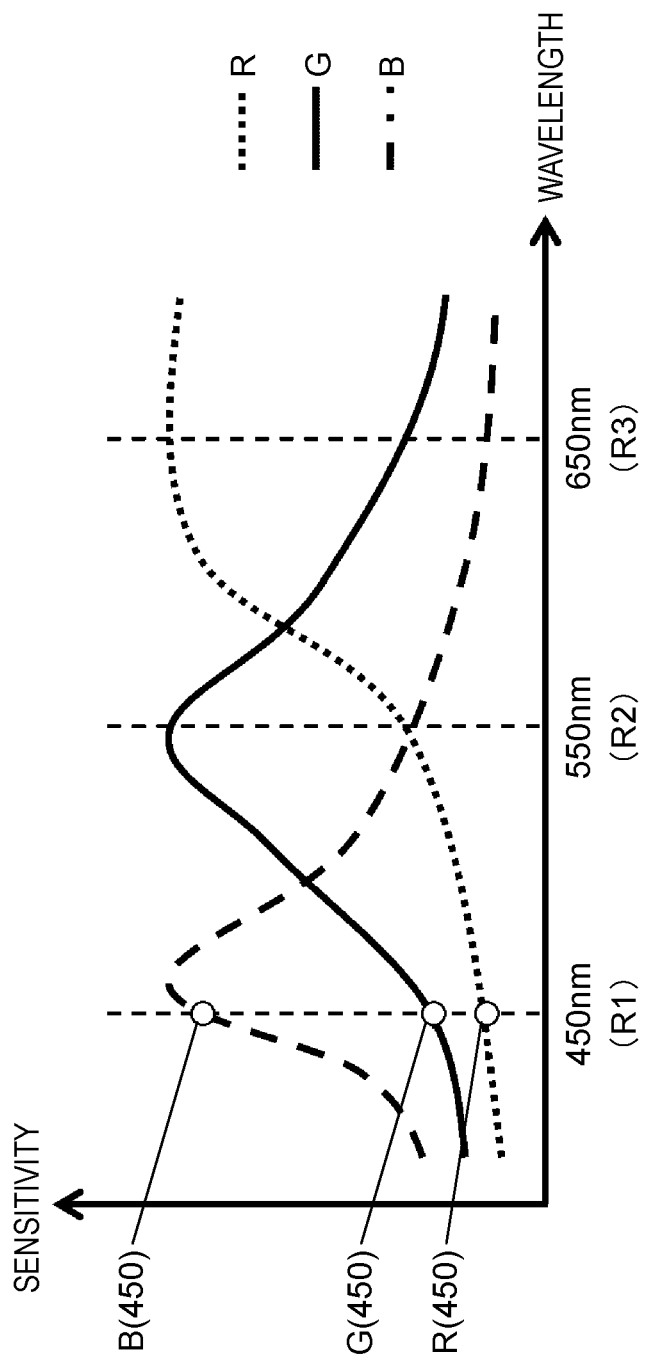
FIG. 2 illustrates spectral sensitivity characteristics of an imaging unit according to the first exemplary embodiment.

FIG. 2 illustrates spectral sensitivity characteristics of imaging unit 130 according to the present exemplary embodiment. In FIG. 2, a horizontal axis indicates a wavelength, and a vertical axis indicates sensitivity to each color of RGB of imaging unit 130. Further, in FIG. 2, a dotted line indicates an R spectral sensitivity characteristic of imaging unit 130, a solid line indicates a G spectral sensitivity characteristic of imaging unit 130, and a broken line indicates a B spectral sensitivity characteristic of imaging unit 130. As illustrated in FIG. 2, the spectral sensitivity characteristics of the three colors of imaging unit 130 have areas that overlap each other. Stated another way, imaging unit 130 has sensitivity to a plurality of colors with respect to monochromatic light having any center wavelength.

Imaging unit 130 simultaneously images reflected light R1, reflected light R2, and reflected light R3. Stated another way, imaging unit 130 images light in which reflected light R1, reflected light R2, and reflected light R3 are mixed. In addition, imaging unit 130 has sensitivity to three colors with respect to all of reflected light R1, reflected light R2, and reflected light R3, as illustrated in FIG. 2. Therefore, in a pixel of each of the colors, an image in which reflected light R1, reflected light R2, and reflected light R3 are mixed is captured.

Next, a sensitivity to each color of imaging unit 130 that corresponds to wavelength λ (nm) is described with reference to FIG. 2. Assume that the R spectral sensitivity characteristic of imaging unit 130 is R(λ), the G spectral sensitivity characteristic of imaging unit 130 is G(λ), and the B spectral sensitivity characteristic of imaging unit 130 is B(λ). As an example, B(450), G(450), and R(450) are sensitivities to the respective colors of imaging unit 130 that correspond to a wavelength of 450 nm, and B(450), G(450), and R(450) are illustrated in FIG. 2. In addition, a sensitivity to each of the colors of imaging unit 130 that corresponds to a certain wavelength is also referred to as a sensitivity to each of the colors of imaging unit 130 that corresponds to a certain light source. This means a sensitivity to each of the colors of imaging unit 130 that corresponds to a center wavelength of the certain light source.

As illustrated in FIG. 2, the spectral sensitivity characteristics of the three colors of imaging unit 130 have areas that overlap each other. Center wavelengths of light source 121, light source 122, and light source 123 are 450 nm, 550 nm, and 650 nm, respectively. Accordingly, a sensitivity to each of the colors of imaging unit 130 that corresponds to the center wavelength (450 nm) of light source 121 is expressed by RGB vector (B(450), G(450), R(450)). A sensitivity to each of the colors of imaging unit 130 that corresponds to the center wavelength (550 nm) of light source 122 is expressed by RGB vector (B(550), G(550), R(550)). A sensitivity to each of the colors of imaging unit 130 that corresponds to the center wavelength (650 nm) of light source 123 is expressed by RGB vector (B(650), G(650), R(650)). These RGB vectors are linearly independent of each other. Stated another way, the sensitivities to each of the colors of imaging unit 130 that correspond to the respective center wavelengths of light source 121, light source 122, and light source 123 are linearly independent of each other.

Memory 140 stores the captured image generated by imaging unit 130. In addition, memory 140 is used as a work memory of arithmetic unit 150. Further, memory 140 stores information relating to the sensitivity to each of the colors of imaging unit 130 that corresponds to each of the light sources. Hereinafter, the information relating to the sensitivity to each of the colors of imaging unit 130 is referred to as sensitivity information. In the present exemplary embodiment, memory 140 stores sensitivity information that corresponds to each of light source 121, light source 122, and light source 123 as sensitivity information that corresponds to each of the light sources. More specifically, the sensitivity information is information relating to a direction of an RGB vector obtained by imaging each of illumination light L1, illumination light L2, and illumination light L3 using imaging unit 130. The sensitivity information that corresponds to each of the light sources is a vector that includes information relating to a relative spectral distribution of each of illumination light L1, illumination light L2, and illumination light L3, and the spectral sensitivity characteristics of imaging unit 130. Assume that this vector is normalized to have a length of 1. The sensitivity information is stored in advance in memory 140. The sensitivity information is obtained, for example, by directly imaging illumination light of each of the light sources using imaging unit 130. The obtained sensitivity information is normalized and is stored in memory 140.

Arithmetic unit 150 performs an arithmetic operation to generate a plurality of separated images from the captured image generated by imaging unit 130, by using the sensitivity information stored in memory 140. Each of the plurality of separated images only includes information about reflected light that corresponds to each of the light sources. Details of the arithmetic operation will be described later. Reflected light that corresponds to light source 121 is reflected light R1, reflected light that corresponds to light source 122 is reflected light R2, and reflected light that corresponds to light source 123 is reflected light R3. In other words, the reflected light that corresponds to each of the light sources means reflected light that is derived from illumination light emitted by a corresponding light source from among rays of reflected light that are reflected by subject 160.

Stated another way, in the present exemplary embodiment, arithmetic unit 150 performs an arithmetic operation to generate a separated image that only includes information about reflected light R1, a separated image that only includes information about reflected light R2, and a separated image that only includes information about reflected light R3 from the captured image generated by imaging unit 130, by using the sensitivity information that corresponds to each of light source 121, light source 122, and light source 123. In other words, arithmetic unit 150 performs an arithmetic operation to generate a plurality of separated images for the center wavelengths of the respective light sources.

In the present exemplary embodiment, only light source 121, light source 122, and light source 123 are used in the imaging of subject 160, and subject 160 is imaged in a darkroom.

[1-2. Operation]

[1-2-1. Operation of Imaging Apparatus]

An operation of imaging apparatus 100 configured as described above is described below.

FIG. 3 is a flowchart for describing the operation of imaging apparatus 100.

(Step S201) CPU 110 instructs lighting unit 120 to turn on light source 121, light source 122, and light source 123. Lighting unit 120 turns on light source 121, light source 122, and light source 123, and simultaneously irradiates subject 160 with illumination light L1, illumination light L2, and illumination light L3.

(Step S202) CPU 110 instructs imaging unit 130 to image subject 160 in a state in which subject 160 is simultaneously irradiated with illumination light L1, illumination light L2, and illumination light L3. Imaging unit 130 images light in which reflected light R1, reflected light R2, and reflected light R3 that have been reflected by subject 160 are mixed. Imaging unit 130 obtains information about three colors, and generates captured image 1 including the information about the three colors. Captured image 1 simultaneously includes information about reflected light R1 obtained by illumination light L1 being reflected by subject 160, information about reflected light R2 obtained by illumination light L2 being reflected by subject 160, and information about reflected light R3 obtained by illumination light L3 being reflected by subject 160. Imaging unit 130 stores captured image 1 in memory 140.

(Step S203) When the imaging in step S202 is finished, CPU 110 instructs lighting unit 120 to turn off light source 121, light source 122, and light source 123. Lighting unit 120 turns off light source 121, light source 122, and light source 123.

(Step S204) CPU 110 instructs arithmetic unit 150 to perform an arithmetic operation. By doing this, arithmetic unit 150 performs an arithmetic operation to generate a plurality of separated images from captured image 1, by using sensitivity information that corresponds to each of light source 121, light source 122, and light source 123. Each of the plurality of separated images only includes information about reflected light that corresponds to each of the light sources. Stated another way, arithmetic unit 150 generates, from captured image 1, three images, a separated image that only includes the information about reflected light R1, a separated image that only includes the information about reflected light R2, and a separated image that only includes the information about reflected light R3.

When imaging unit 130 continuously images subject 160, step S203 may be omitted. In this case, step S202 and step S204 may be performed again in a state in which light source 121, light source 122, and light source 123 are in the ON state, and step S203 may be performed at an arbitrary timing.

[1-2-2. Arithmetic Operation]

The arithmetic operation in step S204 is described in detail.

The arithmetic operation is performed on each pixel of captured image 1. When the imaging element has a Bayer array structure in which a plurality of color filters are arranged in a checkered pattern, as in the present exemplary embodiment, only a single color value is included in a single pixel. Accordingly, processing is performed in advance in which a color value that is not included in a single pixel is created by performing interpolation using information about peripheral pixels such that a plurality of color values are included in the single pixel. A method for providing a plurality of color values in a single pixel is not limited to the method described above, and any method can be employed. In addition to the imaging element described above, an imaging element that includes a plurality of color values in a single pixel exists. In addition to the method described above, a method exists for splitting light using a dichroic mirror and entering rays of light of respective colors into a plurality of monochromatic imaging elements that are provided optically coaxially. Therefore, the imaging element and the method described above may be employed instead.

In captured image 1, assume that a single pixel on which an arithmetic operation will be performed is pixel p. An RGB vector serving as an RGB value is recorded in each of the pixels.

An RGB vector of pixel p is a sum of an RGB vector of reflected light R1, an RGB vector of reflected light R2, and an RGB vector of reflected light R3. Here, each of light source 121, light source 122, and light source 123 is an LED that emits monochromatic illumination light. Accordingly, it can be considered that a direction of the RGB vector of reflected light R1 is identical to a direction of an RGB vector serving as sensitivity information that corresponds to light source 121. It can also be considered that a direction of the RGB vector of reflected light R2 is identical to a direction of an RGB vector serving as sensitivity information that corresponds to light source 122. Further, it can be considered that a direction of the RGB vector of reflected light R3 is identical to a direction of an RGB vector serving as sensitivity information that corresponds to light source 123.

By utilizing the above, RGB vector Ip of pixel p can be expressed as the following. Assume that the RGB vector serving as the sensitivity information that corresponds to light source 121 is r1, the RGB vector serving as the sensitivity information that corresponds to light source 122 is r2, and the RGB vector serving as the sensitivity information that corresponds to light source 123 is r3. In this case, vector Ip can be expressed as a linear combination of vector r1, vector r2, and vector r3. Here, assume that the RGB vector of pixel p is expressed such that $Ip=(Ip_R, Ip_G, Ip_B)$. Also assume that a plurality of RGB vectors stored in memory 140 are expressed such that $r1=(r1_R, r1_G, r1_B)$, $r2=(r2_R, r2_G, r2_B)$, and $r3=(r3_R, r3_G, r3_B)$. With this configuration, vector Ip is expressed by the following formula.

[Formula 1]

$$\begin{pmatrix} Ip_R \\ Ip_G \\ Ip_B \end{pmatrix} = w_1 \begin{pmatrix} r1_R \\ r1_G \\ r1_B \end{pmatrix} + w_2 \begin{pmatrix} r2_R \\ r2_G \\ r2_B \end{pmatrix} + w_3 \begin{pmatrix} r3_R \\ r3_G \\ r3_B \end{pmatrix} \quad \text{Formula 1}$$

In this formula, $w_1$ is a weight of vector r1, $w_2$ is a weight of vector r2, and $w_3$ is a weight of vector r3.

Formula 1 is simultaneous equations formed by three equations including three unknown quantities, $w_1$, $w_2$, and $w_3$. In addition, the RGB vectors serving as pieces of sensitivity information that correspond to the respective light sources are linearly independent of each other. Therefore, the simultaneous equations can be solved, and the respective unknown quantities can be calculated. In order to calculate $w_1$, $w_2$, and $w_3$, the simultaneous equations may be solved using an arbitrary method. As an example, the simultaneous equations may be expressed using a matrix, and the simultaneous equations may be solved by performing an arithmetic operation using an inverse matrix.

Moreover, the RGB vector of reflected light R1 in pixel p can be calculated from a product of $w_1$ and vector r1. The RGB vector of reflected light R2 in pixel p can be calculated from a product of $w_2$ and vector r2. The RGB vector of reflected light R3 in pixel p can be calculated from a product of $w_3$ and vector r3. These RGB vectors respectively correspond to a first term, a second term, and a third term on a right-hand side of Formula 1.

By performing the arithmetic operation described above on all of the pixels, arithmetic unit 150 can calculate, from captured image 1, two-dimensional distribution information of the RGB vector of each of reflected light R1, reflected light R2, and reflected light R3. Stated another way, arithmetic unit 150 can perform an arithmetic operation to generate, from captured image 1, a separated image that only includes information about reflected light R1, a separated image that only includes information about reflected light R2, and a separated image that only includes information about reflected light R3. Stated yet another way, arithmetic unit 150 can separate captured image 1 into the separated image that only includes the information about reflected light R1, the separated image that only includes the information about reflected light R2, and the separated image that only includes the information about reflected light R3. Each of the separated images includes an RGB vector in each of the pixels, and therefore each of the separated images is a color image. As described above, arithmetic unit 150 calculates intensities of a plurality of separated images by solving simultaneous equations formed by a prescribed number of equations that corresponds to a number of light sources or a number of colors, where the sensitivity information is a coefficient. Arithmetic unit 150 generates the plurality of separated images using the intensities of the plurality of separated images.

Further, in the present exemplary embodiment, the center wavelength of each of the plurality of light sources may be changed. Stated another way, an arbitrary light source of light source 121, light source 122, and light source 123 may be replaced with another light source for which a center wavelength is different from the center wavelengths of light source 121, light source 122, and light source 123. When a light source is replaced, memory 140 newly stores sensitivity information that corresponds to the replaced light source. Alternatively, memory 140 may store in advance the sensitivity information that corresponds to the replaced light source. As illustrated in FIG. 2, the spectral sensitivity characteristics of three colors of imaging unit 130 have areas that overlap each other. Even when an arbitrary combination of wavelengths different from each other is selected from a wavelength range including respective center wavelengths of a plurality of light sources, respective pieces of sensitivity information that correspond to the selected wavelengths are linearly independent of each other. Accordingly, respective pieces of sensitivity information that correspond to light sources after the arbitrary light source has been replaced are linearly independent of each other. Thus, arithmetic unit 150 can solve equations. This enables a combination of wavelengths to be freely selected by only changing a center wavelength of a light source without changing imaging unit 130 itself. Therefore, imaging apparatus 100 can increase a degree of freedom in selection of a wavelength to be used.

Thus, imaging apparatus 100 can freely select a wavelength optimal for observation according to the circumstances, and can change a wavelength to the selected wavelength.

[1-3. Conclusion]

Imaging apparatus 100 according to the first exemplary embodiment includes lighting unit 120, imaging unit 130, memory 140, and arithmetic unit 150. Lighting unit 120 includes a plurality of light sources that respectively emit rays of monochromatic illumination light that have center wavelengths different from each other. Lighting unit 120 simultaneously irradiates subject 160 with plural rays of illumination light emitted by the plurality of light sources. Imaging unit 130 simultaneously images plural rays of reflected light obtained by the plural rays of illumination light being reflected by subject 160 so as to obtain information about a plurality of colors, and imaging unit 130 generates captured image 1 including the information about the plurality of colors. Memory 140 stores sensitivity information that corresponds to each of the plurality of light sources and that relates to sensitivities to the plurality of colors of imaging unit 130. Arithmetic unit 150 performs an arithmetic operation to generate a plurality of separated images from captured image 1 generated by imaging unit 130, by using the sensitivity information that has been stored in memory 140 and that corresponds to each of the plurality of light sources. Each of the plurality of separated images only includes information about reflected light that corresponds to each of the plurality of light sources.

Stated another way, arithmetic unit 150 performs an arithmetic operation to generate, from captured image 1, a separated image that corresponds to a wavelength of each of the light sources. Stated yet another way, arithmetic unit 150 performs an arithmetic operation to generate, from captured image 1, a plurality of separated images that each only include information about reflected light that corresponds to each of the light sources. Therefore, arithmetic unit 150 can perform an arithmetic operation to generate, from a single captured image, a plurality of separated images that each only include information about reflected light that corresponds to each of the light sources.

Thus, the present disclosure can contribute to an increase in the speed of imaging and the temporal simultaneity of pieces of information about subject 160 that are included in a plurality of separated images.

In addition, respective pieces of sensitivity information that correspond to light sources to be used are linearly independent of each other. Therefore, arithmetic unit 150 can perform an arithmetic operation to generate a plurality of separated images from a single captured image generated by imaging unit 130.

Further, respective pieces of sensitivity information that correspond to wavelengths in a wide wavelength range are linearly independent of each other. Therefore, imaging apparatus 100 can increase a degree of freedom in selection of a wavelength that corresponds to each of the plurality of separated images.

Second Exemplary Embodiment

[2-1. Configuration]

A second exemplary embodiment is described below with reference to FIGS. 4 and 5.

FIG. 4 is a block diagram illustrating a configuration of imaging apparatus 200 according to the second exemplary embodiment.

Imaging apparatus 200 according to the second exemplary embodiment has a configuration in which a component and an operation are newly added to the configuration according to the first exemplary embodiment. Only a difference between the configuration according to the first exemplary embodiment and the configuration according to the second exemplary embodiment is described below, and description of the same portion is omitted.

Imaging apparatus 200 according to the second exemplary embodiment further includes light source intensity determining unit 170. In addition, imaging apparatus 200 includes central processing unit (CPU) 210 instead of CPU 110, and CPU 210 performs an operation similar to the operation of CPU 110 and an additional operation.

Light source intensity determining unit 170 determines an intensity of illumination light of each light source in next imaging from an intensity of each of a plurality of separated images generated by arithmetic unit 150. Further, light source intensity determining unit 170 outputs information about the determined intensity of the illumination light to CPU 210. Light source intensity determining unit 170 may read the plurality of separated images generated by arithmetic unit 150 from memory 140 in accordance with an instruction of CPU 210, may determine an intensity of illumination light of each of the light sources in imaging in next imaging, and may store information about the determined intensity of the illumination light in memory 140. In this case, CPU 210 may read the information about the intensity of the illumination light from memory 140. Arithmetic unit 150 stores in advance the plural generated separated images in memory 140.

CPU 210 instructs lighting unit 120 to control the intensity of the illumination light of each of the light sources on the basis of the information about the intensity of the illumination light of each of the light sources in next imaging that has been output from light source intensity determining unit 170. Lighting unit 120 independently controls the intensity of the illumination light of each of the light sources.

Lighting unit 120 causes the light respective sources to emit illumination light at the determined intensities in accordance with an instruction of CPU 210, and simultaneously irradiates subject 160 with the illumination light emitted by each of the light sources.

[2-2. Operation]

[2-2-1. Operation of Imaging Apparatus]

An operation of imaging apparatus 200 configured as described above is described below.

FIG. 5 is a flowchart for describing the operation of imaging apparatus 200. Step S201 to step S204 in the operation of imaging apparatus 200 are similar to step S201 to step S204 in the operation of imaging apparatus 100 according to the first exemplary embodiment.

(Step S205) Light source intensity determining unit 170 determines respective intensities of illumination light L1, illumination light L2, and illumination light L3 in next imaging from respective intensities of a plurality of separated images generated by arithmetic unit 150. Light source intensity determining unit 170 outputs information about the determined intensities of the respective rays of illumination light to CPU 210.

(Step S206) CPU 210 instructs lighting unit 120 to turn on light source 121, light source 122, and light source 123 such that light source 121, light source 122, and light source 123 will emit illumination light at the respective intensities that have been determined by light source intensity determining unit 170. Lighting unit 120 turns on light source 121, light source 122, and light source 123 such that light source 121, light source 122, and light source 123 emit illumination light at the respective determined intensities, and lighting unit 120 simultaneously irradiates subject 160 with illumination light L1, illumination light L2, and illumination light L3. Then, imaging apparatus 200 performs operations that are similar to step S202 to step S204 so as to perform an arithmetic operation to generate a new plurality of separated images.

[2-2-2. Control of Intensity of Light Source]

Control of an intensity of a light source is described in detail.

Imaging apparatus 200 first performs the operations of step S201 to step S204 using an arbitrary intensity of each illumination light. Then, arithmetic unit 150 outputs a plurality of separated images to light source intensity determining unit 170. In the present exemplary embodiment, a separated image that corresponds to light source 121 is referred to as separated image I1, a separated image that corresponds to light source 122 is referred to as separated image I2, and a separated image that corresponds to light source 123 is referred to as separated image I3.

Light source intensity determining unit 170 calculates mean values of intensities in arbitrary areas that exist spatially in the same position in separated image I1, separated image I2, and separated image I3. In the present exemplary embodiment, light source intensity determining unit 170 sets, as each of the arbitrary areas, a square area with a centroid position of a subject of interest as a center. In addition, light source intensity determining unit 170 uses a length of an RGB vector as the intensity in each of the arbitrary areas.

In separated image I1, the arbitrary area is assumed to be area A1. In separated image I2, an area that exists spatially in the same position as the position of arbitrary area A1 is assumed to be area A2. In separated image I3, an area that exists spatially in the same position as the position of arbitrary area A1 is assumed to be area A3. Light source intensity determining unit 170 first calculates a mean value of intensities in area A1, a mean value of intensities in area A2, and a mean value of intensities in area A3.

Light source intensity determining unit 170 determines an intensity of illumination light of each of the light sources in the next imaging by using the mean value of the intensities in each of area A1, area A2, and area A3. Here, assume that, in first imaging, the intensities of the rays of illumination light of the respective light sources are identical to each other. In this case, when a ratio of reflectances of subject 160 that correspond to the respective center wavelengths of light source 121, light source 122, and light source 123 is 1:2:4, a ratio of the respective mean values of the intensities in area A1, area A2, and area A3 is 1:2:4. Therefore, in separated image I1 and separated image I2, an intensity of a signal is small, and a signal-to-noise (S/N) ratio of the signal is relatively small in comparison with separated image I3. In this case, light source intensity determining unit 170 determines the intensities of the respective rays of illumination light in the next imaging in such a way that the intensities of illumination light L1 and illumination light L2 relatively become greater than the intensity of illumination light L3. As an example, light source intensity determining unit 170 determines the intensities of illumination light L1, illumination light L2, and illumination light L3 to be 4 times, twice, and 1 time the intensities in the first imaging, respectively, and light source intensity determining unit 170 outputs information about the determined intensities of the respective rays of illumination light to CPU 210.

CPU 210 receives the information about the intensities of the rays of illumination light of the respective light sources that has been output from light source intensity determining unit 170, and instructs lighting unit 120 to control the intensities of the rays of illumination light of the respective light sources. Assume, for example, that the intensities of the respective rays of illumination light in the first imaging are L. Lighting unit 120 controls the intensities of the rays of illumination light of the respective light sources in such a way that the intensities of illumination light L1, illumination light L2, and illumination light L3 are 4L, 2L, and 1L, respectively. By doing this, in the next imaging, the mean values of the intensities in area A1, area A2 and, area A3 become almost the same as each other.

Lighting unit 120 receives an instruction from CPU 210, and independently controls the intensities of the rays of illumination light of the respective light sources to be the determined intensities of the rays of illumination light. Stated another way, lighting unit 120 causes light source 121, light source 122, and light source 123 to emit illumination light at intensities of rays of illumination light of 4L, 2L, and 1L, respectively, and lighting unit 120 irradiates subject 160 with the respective rays of illumination light.

By doing this, the intensities of the rays of illumination light of light source 121 and light source 122 for which an intensity of reflected light is relatively small increase. Therefore, intensities of signals of separated image I1 and separated image I2 that have been generated increase. Accordingly, S/N ratios of the signals of separated image I1 and separated image I2 increase.

In the present exemplary embodiment, light source intensity determining unit 170 sets, as the arbitrary area, a square area with a centroid position of a subject of interest as a center. However, the present disclosure is not limited to this, and light source intensity determining unit 170 may set an area having an arbitrary shape with an arbitrary spatial position as a center. As another example, light source intensity determining unit 170 may set, as the arbitrary area, an arbitrary area in which a subject of interest exists. By setting, as the arbitrary area, an arbitrary area in which a subject of interest exists, light source intensity determining unit 170 can determine arbitrary or optimum intensities of the rays of illumination light of the respective light sources with respect to the subject of interest.

In the present exemplary embodiment, light source intensity determining unit 170 uses the length of an RGB vector as an intensity in an arbitrary area. However, the present disclosure is not limited to this, and light source intensity determining unit 170 may use an arbitrary definition. As an example, light source intensity determining unit 170 may use a magnitude of a single value of the RGB vector as the intensity in the arbitrary area. Stated another way, light source intensity determining unit 170 may only use an R value, a G value, or a B value, which is a single value of the RGB vector, as the intensity in the arbitrary area.

In the present exemplary embodiment, light source intensity determining unit 170 calculates a mean value of intensities in an arbitrary area. However, the present disclosure is not limited to this, and light source intensity determining unit 170 may calculate a minimum value, a maximum value, or a median of the intensities in the arbitrary area.

In the present exemplary embodiment, light source intensity determining unit 170 determines the intensities of the respective rays of illumination light in such a way that an intensity of illumination light of a light source having a small intensity of reflected light increases. However, the present disclosure is not limited to this, and light source intensity determining unit 170 may determine the intensities of the respective rays of illumination light in such a way that an intensity of illumination light of a light source having a great intensity of reflected light decreases. As an example, lighting unit 120 may irradiate subject 160 with illumination light L1, illumination light L2, and illumination light L3 at intensities of 1L, 0.5L, and 0.25L, respectively. Alternatively, light source intensity determining unit 170 may determine the intensities of the respective rays of illumination light in such a way that an intensity of illumination light of a light source having a small intensity of reflected light increases, and may determine the intensities of the respective rays of illumination light in such a way that an intensity of illumination light of a light source having a great intensity of reflected light decreases. Stated another way, light source intensity determining unit 170 may perform both of the determinations described above at a time.

In the present exemplary embodiment, light source intensity determining unit 170 determines the intensities of the rays of illumination light of the respective light sources in such a way that the mean values of the intensities in area A1, area A2, and area A3 become almost the same as each other. However, the present disclosure is not limited to this, and light source intensity determining unit 170 may determine the intensities of the rays of illumination light of the respective light sources in such a way that the mean values of the intensities in area A1, area A2, and area A3 have an arbitrary intensity ratio.

In the present exemplary embodiment, in the first imaging, the intensities of the rays of illumination light of the respective light sources are identical to each other. However, the present disclosure is not limited to this, and the intensities of the rays of illumination light of the respective light sources may be set in advance by a user. As an example, when a spectral reflectance of subject 160 is known, a user may set in advance an intensity of illumination light of a light source that corresponds to a wavelength at which a reflectance is relatively small to be greater than intensities of rays of illumination light of the other light sources. The user may set in advance the intensities of the rays of illumination light of the respective light sources in an arbitrary method. Imaging apparatus 200 may include an interface that the user sets an intensity of illumination light of each of a plurality of light sources. The interface described above is, for example, a keyboard.

[2-3. Conclusion]

Imaging apparatus 200 according to the second exemplary embodiment further includes light source intensity determining unit 170 in addition to the configuration of imaging apparatus 100 according to the first exemplary embodiment. Light source intensity determining unit 170 determines intensities of rays of illumination light of a plurality of light sources in next imaging from respective intensities of a plurality of separated images.

This allows an increase in an intensity of a signal of a separated image that corresponds to reflected light for which an intensity is relatively smaller than the intensities of the other rays of reflected light. Accordingly, an S/N ratio of the signal of the separated image increases.

Other Exemplary Embodiments

The first and second exemplary embodiments have been described above as an illustrative example of the technique disclosed in the present application. However, the technique of the present disclosure is not limited to these exemplary embodiments, and can also be applied to exemplary embodiments in which changes, replacements, additions, omissions, and the like are made. Further, it is possible to form a new exemplary embodiment by combining the respective components described above in the first and second exemplary embodiments.

Therefore, other exemplary embodiments are illustrated below.

In the first and second exemplary embodiments, three light sources simultaneously apply illumination light, and imaging unit 130 can obtain three colors (RGB). However, the present disclosure is not limited to this. A number of light sources and a number of colors that imaging unit 130 can obtain may be set to arbitrary numbers as long as a number of equations is greater than a number of unknown quantities. Stated another way, the number of light sources that simultaneously apply illumination light may be set to be smaller than or equal to the number of colors that imaging unit 130 can obtain. As an example, when imaging unit 130 can obtain four colors, the number of light sources that simultaneously apply illumination light may be set to 4 or less. When the number of equations is smaller than the number of unknown quantities, namely, when the number of colors that imaging unit 130 can obtain is smaller than the number of light sources that simultaneously apply illumination light, arithmetic unit 150 may calculate an optimal solution using a method such as a least-squares method. When the number of light sources that simultaneously apply illumination light and the number of colors that imaging unit 130 can obtain increase, sensitivity information that corresponds to each of the light sources and that has been stored in memory 140 needs to be changed appropriately. As an example, when imaging unit 130 can obtain four colors, a vector serving as the sensitivity information that corresponds to each of the light sources is a four-dimensional vector.

In the first and second exemplary embodiments, a plurality of colors that imaging unit 130 obtains are R, G, and B. However, the plurality of colors that imaging unit 130 obtains are not limited to R, G, and B. The plurality of colors that imaging unit 130 obtains may include yellow (Y). The plurality of colors that imaging unit 130 obtains may include infrared light. Stated another way, in the present disclosure, the colors that imaging unit 130 obtains are not limited to colors that correspond to a wavelength range of visible light. When imaging unit 130 obtains information about color of infrared light, the imaging apparatus can obtain information about subject 160 that corresponds to the infrared light.

In the first and second exemplary embodiments, an LED is used as a light source that emits monochromatic illumination light. However, any light source that emits the monochromatic illumination light can be used. As an example, the light source that emits the monochromatic illumination light may be a laser, or may be a light source that includes an optical filter that transmits light of a specified wavelength. Lighting unit 120 may include a single light source that emits white light, and a monochromator that generates plural rays of illumination light. The monochromator can split white light so as to generate plural rays of illumination light. In this case, the single light source that emits white light corresponds to a plurality of light sources that respectively emit rays of monochromatic illumination light that have center wavelengths different from each other. In a broad sense, in constituting equations, any light source may be used as long as it can be considered that an RGB vector of reflected light including a spectral reflectance distribution of subject 160 is identical to a direction of an RGB vector serving as sensitivity information that corresponds to a light source. Here, as a wavelength band of illumination light becomes narrower, a difference between the RGB vector of reflected light and the RGB vector serving as the sensitivity information decreases. Therefore, when an LED or a laser of a narrow wavelength band is used as a light source, arithmetic unit 150 can perform an arithmetic operation to more precisely generate a separated image that corresponds to each wavelength.

In the first and second exemplary embodiments, light sources are used that respectively have center wavelengths of 450 nm, 550 nm, and 650 nm. However, the present disclosure is not limited to this, and light sources that respectively have arbitrary center wavelengths may be used as long as equations can be solved by using the arbitrary center wavelengths together with characteristics of imaging unit 130.

In the first and second exemplary embodiments, subject 160 is imaged in a darkroom. However, subject 160 may be imaged in presence of ambient light. In this case, as an example, arithmetic unit 150 may generate a difference image between a captured image generated during irradiation with illumination light and a captured image generated without irradiation with illumination light. The difference image only includes information about reflected light that relates to the illumination light. Therefore, the difference image can be considered to be substantially equivalent to a captured image generated in the darkroom.

In the first and second exemplary embodiments, a plurality of separated images are generated from a product of RGB vectors (r1, r2, r3) serving as sensitivity information and weights ($w_1, w_2, w_3$) that correspond to the respective RGB vectors. However, the present disclosure is not limited to this, and the plurality of separated images may be generated from the respective weights ($w_1, w_2, w_3$).

In the first and second exemplary embodiments, a length of the RGB vector serving as the sensitivity information is normalized to 1. However, the present disclosure is not limited to this. The RGB vector may have any length. The weight changes according to the length of the RGB vector, and therefore the product of the weight and the RGB vector becomes a fixed vector.

The length of the RGB vector may be normalized to a value according to an intensity of illumination light of a light source on the basis of information about the intensity of illumination light of each of the light sources. As an example, when a ratio of the intensities of the rays of illumination light of the respective light sources is 1:2:3, the lengths of RGB vectors that each are sensitivity information that corresponds to each of the light sources may be normalized to 1, 2, and 3, respectively. Alternatively, the length of each of the RGB vectors may be normalized to an arbitrary length such that a ratio of the lengths of the RGB vectors is 1:2:3.

In the present disclosure, an RGB value is used as color information. However, the present disclosure is not limited to this, and arbitrary color information may be used. As an example, values, such as a luminance signal and a color difference signal, that are obtained by performing linear transformation on the RGB value may be used.

In the first and second exemplary embodiments, arithmetic unit 150 performs the arithmetic operation of step S204 on all of the pixels. However, the present disclosure is not limited to this. As an example, arithmetic unit 150 may only perform the arithmetic operation on some pixels of an image.

In the first and second exemplary embodiments, the sensitivity information is an RGB vector obtained by imaging each light source using imaging unit 130. However, the present disclosure is not limited to this. The sensitivity information may be spectral information that includes a relative spectral distribution of each of the light sources that corresponds to a smaller interval between wavelengths and spectral sensitivity characteristics of the imaging element. In this case, arithmetic unit 150 converts the spectral information described above into an RGB value by integrating the spectral information in a wavelength direction so as to calculate an RGB vector. In addition, the spectral information of each of the light sources and the spectral information of the imaging element may be individually stored in memory 140, and may be combined by performing an arithmetic operation.

In the first and second exemplary embodiments, the sensitivity information is calculated by normalizing an RGB value obtained by directly imaging each illumination light using imaging unit 130. However, the sensitivity information may be calculated using an arbitrary method. Normalization of the RGB value is as described above, but the RGB value does not always need to be obtained using the method described above. Arithmetic unit 150 may calculate the RGB value from the spectral sensitivity characteristic of each color of imaging unit 130. In this case, memory 140 stores in advance the spectral sensitivity characteristics of imaging unit 130 that correspond to center wavelengths of light sources to be used or an arbitrary plurality of wavelengths including the center wavelengths of the light sources to be used. The sensitivity information may be calculated using sensitivities to a plurality of colors of imaging unit 130 that correspond to the center wavelength of each of a plurality of light sources. As an example, memory 140 stores spectral sensitivity characteristics of imaging unit 130 obtained by sampling a wavelength band ranging from 400 nm to 700 nm at intervals of 5 nm. Arithmetic unit 150 calculates an RGB value, according to a center wavelength of a light source to be used, by using the spectral sensitivity characteristics of imaging unit 130. As another example, imaging unit 130 stores, in memory 140, RGB values obtained by imaging illumination light in a wavelength band ranging from 400 nm to 700 nm at intervals of 5 nm. Arithmetic unit 150 may calculate an RGB value according to a center wavelength of a light source to be used.

In the first and second exemplary embodiments, the spectral sensitivity characteristics of imaging unit 130 are the characteristics illustrated in FIG. 2. However, the spectral sensitivity characteristics of imaging unit 130 are not limited to the characteristics illustrated in FIG. 2, and may be any spectral sensitivity characteristics as long as respective pieces of sensitivity information that correspond to light sources to be used are linearly independent of each other. However, in order to increase a degree of freedom in the selection of a wavelength, imaging unit 130 is suitable in which sensitivities to respective colors overlap each other in a wide area and in which, in a wavelength range including a center wavelength of each of a plurality of light sources, respective pieces of sensitivity information that correspond to wavelengths different from each other are linearly independent of each other, as illustrated in FIG. 2. Here, the wavelength range including the center wavelength of each of the plurality of light sources means, for example, a continuous wavelength range of 450 nm to 650 nm including a center wavelength of 450 nm, a center wavelength of 550 nm, and a center wavelength of 650 nm. By doing this, even when the center wavelengths of the plurality of light sources are changed to arbitrary center wavelengths within the wavelength range described above, respective pieces of sensitivity information that correspond to the plurality of light sources are linearly independent of each other. As another example, light is optically split in an area where the sensitivities to respective colors of imaging unit 130 do not overlap each other, but light is not optically split in an area where the sensitivities to the respective colors of imaging unit 130 overlap each other. Meanwhile, the present disclosure is particularly effective in a case where sensitivities to a plurality of colors of imaging unit 130 have areas that overlap each other at a wavelength of a light source to be used. Therefore, spectral sensitivity characteristics of imaging unit 130 of at least 2 colors of colors that imaging unit 130 can obtain may have areas that overlap each other at a center wavelength of each of a plurality of light sources.

In addition, the imaging apparatus may further include a determining unit. The determining unit determines whether respective pieces of sensitivity information that correspond to light sources to be used are linearly independent of each other. Before arithmetic unit 150 performs an arithmetic operation, the determining unit determines whether respective pieces of sensitivity information that correspond to light sources and that are stored in memory 140 are linearly independent of each other, and the determining unit outputs a determination result to a CPU. When a determination result indicating that the respective pieces of sensitivity information are linearly independent of each other is input to the CPU, the CPU causes arithmetic unit 150 to perform an arithmetic operation. When a determination result indicating that the respective pieces of sensitivity information are not linearly independent of each other is input to the CPU, the CPU does not cause arithmetic unit 150 to perform an arithmetic operation. When the determination result indicating that the respective pieces of sensitivity information are not linearly independent of each other is input to the CPU, the CPU may further report to a user that an arithmetic operation will fail to be performed on a combination of the light sources to be used, by using an arbitrary method.

In the first and second exemplary embodiments, lighting unit 120 includes three light sources. However, the present disclosure is not limited to this, and lighting unit 120 may include an arbitrary number of light sources having different center wavelengths that is greater than or equal to 2. In imaging, lighting unit 120 may select an arbitrary number of light sources that is smaller than or equal to a number of colors that imaging unit 130 can obtain from among the arbitrary number of light sources that is greater than or equal to 2. In this case, memory 140 stores respective pieces of sensitivity information that correspond to light sources that may be used from among the arbitrary number of light sources that is greater than or equal to 2. As an example, lighting unit 120 may be configured to include light source 124, light source 125, and light source 126 in addition to light source 121, light source 122, and light source 123. In imaging under a certain condition, lighting unit 120 selects and uses light source 121, light source 123, and light source 125 as light sources to be used. In imaging under another condition, lighting unit 120 switches light sources to be used, and selects and uses light source 123, light source 124, and light source 125 as light sources to be used. In imaging under yet another condition, lighting unit 120 may select and use a different combination of light sources as light sources to be used.

In the first and second exemplary embodiments, the imaging apparatus is configured to be able to obtain information about an intensity of illumination light of each of the light sources. Therefore, arithmetic unit 150 may correct an intensity of a separated image that corresponds to each of the light sources by using the obtained information about the intensity of the illumination light of each of the light sources. As an example, when a ratio of intensities of light source 121, light source 122, and light source 123 is 1:2:3, arithmetic unit 150 corrects separated images by multiplying respective intensities of the separated images by 1, ½, and ⅓. By doing this, a ratio of the intensities of the rays of illumination light of the respective light sources can be considered to be 1:1:1. Arithmetic unit 150 generates respective separated images that correspond to intensities of rays of illumination light of light sources that are identical to each other such that arithmetic unit 150 can calculate information about a relative spectral reflectance of subject 160. In addition, when arithmetic unit 150 obtains an illuminance in a position of subject 160, arithmetic unit 150 can calculate information about an absolute spectral reflectance of subject 160.

A plurality of light sources in the first and second exemplary embodiments may be disposed in such a way that a ratio of intensities of rays of illumination light of the respective light sources becomes constant on subject 160. By doing this, as an example, in the analysis of subject 160 using an intensity of each reflected light on subject 160, a ratio of intensities of rays of reflected light of the respective light sources in each position on subject 160 can be analyzed similarly. The ratio of the intensities of the rays of reflected light of the respective light sources corresponds to a relative spectral distribution, and is qualitative information. Therefore, the ratio can be qualitatively analyzed. When a plurality of light sources are not disposed in such a way that the ratio of the intensities of the rays of illumination light of the respective light sources becomes constant on subject 160, the ratio of the intensities of the rays of illumination light changes according to a position on subject 160. Therefore, the ratio of the intensities of the rays of reflected light of the respective light sources in each of the positions on subject 160 cannot be analyzed similarly. Even when the ratio of the intensities of the rays of illumination light of the respective light sources is not constant in a prescribed space, the imaging apparatus can correct a difference in a ratio of three-dimensional intensities of the rays of illumination light of the respective light sources afterward, by obtaining in advance a distribution of the ratio of the intensities of the rays of illumination light in the prescribed space of subject 160, the ratio corresponding to the respective light sources, and by simultaneously obtaining a distance between subject 160 and each of the light sources in imaging.

In the first and second exemplary embodiments, the imaging apparatus generates a plurality of separated images that correspond to the respective light sources such that a distribution of reflection characteristics of subject 160 that corresponds to a plurality of wavelengths can be obtained. Therefore, the imaging apparatus can analyze subject 160 by performing an arbitrary analysis method using the distribution of the reflection characteristics of subject 160 that corresponds to the plurality of wavelengths. The imaging apparatus can obtain, for example, characteristics in each position of subject 160 from the distribution of the reflection characteristics of subject 160 that corresponds to the plurality of wavelengths. Therefore, the imaging apparatus may perform arbitrary analysis using a plurality of separated images.

It should be noted that, since the aforementioned exemplary embodiments illustrate a technique of the present disclosure, various changes, replacements, additions, omissions, and the like can be made in the claims and their equivalents.

INDUSTRIAL APPLICABILITY

The present disclosure is applicable to an apparatus that images reflected light reflected by a subject so as to analyze the subject. Specifically, the present disclosure is applicable to an imaging apparatus, an analysis apparatus, and the like.

REFERENCE MARKS IN THE DRAWINGS 100, 200 imaging apparatus
110, 210 CPU
120 lighting unit
121, 122, 123, 124, 125, 126 light source
130 imaging unit
140 memory
150 arithmetic unit
160 subject
170 light source intensity determining unit
L1, L2, L3 illumination light
R1, R2, R3 reflected light

The invention claimed is:

1. An imaging apparatus comprising:
a lighting unit that includes a plurality of light sources that respectively emit plural rays of illumination light, the plural rays of illumination light being monochromatic and having center wavelengths different from each other, the lighting unit simultaneously irradiating a subject with the plural rays of illumination light emitted by the plurality of light sources;
an imaging unit that simultaneously images plural rays of reflected light obtained by the plural rays of illumination light being reflected by the subject so as to obtain information about a plurality of colors, and generates a captured image including the information about the plurality of colors;
a memory that stores sensitivity information items, the sensitivity information items corresponding to the plurality of light sources respectively, each of the sensitivity information items relating to sensitivities of the imaging unit to the plurality of colors; and
an arithmetic unit that performs an arithmetic operation to generate a plurality of separated images from the captured image by using the sensitivity information items, the plurality of separated images corresponding to the plurality of light sources respectively, each of the plurality of separated images only including information about a corresponding one of the plural rays of reflected light.

2. The imaging apparatus according to claim 1, wherein a number of the plurality of light sources is smaller than or equal to a number of the plurality of colors.

3. The imaging apparatus according to claim 1, wherein spectral sensitivity characteristics of at least two colors of the imaging unit have areas that overlap each other at a center wavelength of each of the plurality of light sources.

4. The imaging apparatus according to claim 1, wherein the sensitivity information items are linearly independent of each other.

5. The imaging apparatus according to claim 4, wherein the arithmetic unit calculates intensities of the plurality of separated images by solving simultaneous equations, where the sensitivity information items are coefficients, the simultaneous equations being formed by a prescribed number of equations that corresponds to a number of the plurality of light sources or a number of the plurality of colors, and the arithmetic unit generates the plurality of separated images using the intensities of the plurality of separated images.

6. The imaging apparatus according to claim 1, wherein the plurality of light sources changes the center wavelengths of the plurality of light sources respectively.

7. The imaging apparatus according to claim 1, wherein an intensity of illumination light of each of the plurality of light sources is greater than an intensity of illumination light having a center wavelength that corresponds to a reflectance of the subject that is greater than a reflectance of the subject that corresponds to a center wavelength of the illumination light of each of the plurality of light sources.

8. The imaging apparatus according to claim 1, wherein the lighting unit independently controls an intensity of illumination light of each of the plurality of light sources.

9. The imaging apparatus according to claim 1, wherein the arithmetic unit corrects intensities of the plurality of separated images by using information about intensities of illumination light of the plurality of light sources.

10. The imaging apparatus according to claim 1, further comprising an interface that is used for a user to set in advance intensities of illumination light of the plurality of light sources.

11. The imaging apparatus according to claim 1, further comprising a light source intensity determining unit that determines intensities of illumination light of the plurality of light sources in next imaging in accordance with intensities of the plurality of separated images.

12. The imaging apparatus according to claim 1, wherein the plurality of light sources are disposed in such a way that a ratio of an intensity of illumination light of each of the plurality of light sources becomes constant on the subject.

13. The imaging apparatus according to claim 1, wherein, in a wavelength range including the center wavelengths of the plurality of light sources, the sensitivity information items that correspond to wavelengths different from each other are linearly independent of each other.

14. The imaging apparatus according to claim 1, wherein the sensitivity information items are obtained by imaging illumination light of the plurality of light sources using the imaging unit.

15. The imaging apparatus according to claim 1, wherein the sensitivities of the imaging unit correspond to the center wavelengths of the plurality of light sources respectively, and the sensitivity information items are calculated using the sensitivities.

16. The imaging apparatus according to claim 1, wherein each of the plurality of light sources is a light emitting diode.

17. The imaging apparatus according to claim 1, wherein each of the plurality of light sources is a laser.

18. The imaging apparatus according to claim 1, wherein each of the plurality of light sources includes an optical filter that transmits light of a specified wavelength.

19. The imaging apparatus according to claim 1, wherein the lighting unit includes a monochromator that generates the plural rays of illumination light.

20. An image processing method comprising:
an irradiation step of simultaneously irradiating a subject with plural rays of illumination light emitted by a plurality of light sources, the plurality of light sources respectively emitting the plural rays of illumination light that are monochromatic and that have center wavelengths different from each other;
an imaging step of simultaneously imaging, by an imaging unit, plural rays of reflected light obtained by the plural rays of illumination light being reflected by the subject so as to obtain information about a plurality of colors, and generating a captured image including the information about the plurality of colors; and
an arithmetic step of performing an arithmetic operation to generate a plurality of separated images from the captured image by using sensitivity information items, the sensitivity information items corresponding to the plurality of light sources respectively, each of the sensitivity information items relating to sensitivities of the imaging unit to the plurality of colors, the plurality of separated images corresponding to the plurality of light sources respectively, each of the plurality of separated images only including information about a corresponding one of the plural rays of reflected light.

* * * * *